_US005335089A_

United States Patent [19]

Xie et al.

[11] Patent Number: 5,335,089
[45] Date of Patent: Aug. 2, 1994

[54] ELECTRONIC HIGH-FIDELITY SCREENLESS CONVERSION SYSTEM AND METHOD USING A SEPARABLE FILTER

[75] Inventors: Zhenhua Xie, Naperville; Michael A. Rodriguez, Palatine, both of Ill.

[73] Assignee: R. R. Donnelley & Sons Company, Lisle, Ill.

[21] Appl. No.: 921,349

[22] Filed: Jul. 29, 1992

[51] Int. Cl.$^5$ ............................................. H04N 1/23
[52] U.S. Cl. .................................... 358/456; 358/458; 358/298
[58] Field of Search ............... 358/448, 455, 456, 457, 358/458, 443, 296, 298; 382/50, 54; H04N 1/23

[56] References Cited

U.S. PATENT DOCUMENTS

| | | | |
|---|---|---|---|
| 4,350,996 | 9/1982 | Rosenfeld | 358/75 |
| 4,449,150 | 5/1984 | Kato | 358/283 |
| 4,477,833 | 10/1984 | Clark et al. | 358/80 |
| 4,481,532 | 11/1984 | Clark et al. | 358/80 |
| 4,482,923 | 11/1984 | Fischer et al. | 358/283 |
| 4,668,995 | 5/1987 | Chen et al. | 358/282 |
| 4,709,395 | 11/1987 | Fischer et al. | 382/54 |
| 4,777,620 | 10/1988 | Shimoni et al. | 364/900 |
| 4,876,611 | 10/1989 | Fischer et al. | 358/456 |
| 4,907,096 | 3/1990 | Stansfield et al. | 358/456 |
| 4,924,322 | 5/1990 | Kurosawa et al. | 358/448 |
| 4,955,065 | 9/1990 | Ulichney | 382/50 |
| 4,987,496 | 1/1991 | Greivenkamp, Jr. | 358/448 |
| 5,051,844 | 9/1991 | Sullivan | 358/456 |
| 5,077,615 | 12/1991 | Tsuji | 358/298 |
| 5,107,346 | 4/1992 | Bowers et al. | 358/447 |

OTHER PUBLICATIONS

Algie, "Resolution and Tonal Continuity in Bilevel Printed Picture Quality," *Computer Vision, Graphics, and Image Processing*, 24, 329–346 (1983).

Anastassiou, et al., "Digital Halftoning of Images," *IBM J. Res. Develop.* vol. 26, No. 6, Nov. 82, pp. 687–697.

Anastassiou, et al., "Digital Image Halftoning Using Neural Networks," *Visual Comm. and Image Processing*, SPIE vol. 1001, 1988, pp. 1062–1066.

Anastassiou, et al., "Progressive Half-Toning of Images," *Electronics Letters*, vol. 24, No. 8, Apr. 14, 1988.

Bernard, et al., "Design of a Half-Toning Integrated Circuit Based on Analog . . .," 1988 *IEEE Symposium on Circuits and Systems*, Espoo, Finland, Jun. 7–9, 1988, pp. 1217–1220.

Billotet-Hoffmann, et al., "Optical Pseudocolor Endoing using Adaptive . . .," *Optics Communication*, vol. 45, No. 5, May 1, 1983, pp. 327–330.

Broja, et al., "Digital Halftoning by Iterative Procedure," *Optics Communications*, vol. 69, No. 3, 4 Jan 1, 1989, pp. 205–210.

Broja, et al., "Error Diffusion Concept for Multi-Level Quantization," *Optics Communications*, vol. 79, NO. 5, Nov. 1, 1990, pp. 280–284.

Carnevali, et al., "Image Processing by Simulated Annealing," *IBM J. Res. Develop.*, vol. 29, No. 6, Nov. 1985, pp. 569–578.

(List continued on next page.)

*Primary Examiner*—Mark R. Powell
*Assistant Examiner*—Cheryl Cohen
*Attorney, Agent, or Firm*—Marshall, O'Toole, Gerstein, Murray & Borun

[57] ABSTRACT

A system for converting a continuous tone value to an output value having either a first level or a second level develops a first error based upon the application of a separable filter to an output value having a first level assumed for the continuous tone value undergoing conversion. A second error is developed based upon the application of the separable filter to an output value having a second level assumed for the continuous tone value undergoing conversion. If the first error is greater than the second error, the continuous tone value is converted to the output value having the second level. Otherwise, the continuous tone value is converted to the output value having the first level. The resulting error is diffused in a predetermined manner to neighboring continuous tone values yet to be converted.

38 Claims, 14 Drawing Sheets

OTHER PUBLICATIONS

Eschbach, et al., "A 2-D Pulse Density Modulation by Iteration . . . ," *Optics Communication*, vol. 62, No. 5, Jun. 1, 1987, pp. 300–304.

Eschbach, "Pulse-Density Modulation on Rastered Media: Combining . . . ," *J. Opt. Soc. Am. A*, vol. 7, No. 4/Apr. 1990, pp. 708–716.

Floyd, et al., "An Adaptive Algorithm for Spatial Greyscale," *Proceedings of the SID*, vol. 17/2 Sec. Qrtr. 1976, pp. 75–77.

Gentile, et al., "Quantization and Multilevel Halftoning of Color Images . . . ," *J. Opt. Soc. Am. A*, vol. 7, No. 4/Apr. 1990, pp. 1019–1026.

Goertzel, et al., "The Design of Interpolation Filters and their Application to Image Scaling and Rotation," conference article dated Apr. 16, 1986 in *Recognition and Image Processing ITL*, Tokyo.

Hale, "Dot Spacing Modulation for the Production of Pseudo Grey Pictures," *Proc. of the SID*, vol. 17/2 Sec. Qrtr. 1976, pp. 63–74.

Jarvis, et al., "A Survey of Techniques for the Display of Continuous . . . ," *Computer, Graphics, and Image Processing*, 5, 13–40 (1976).

Kim, et al., "Design of Optimal Filters for Error-Feedback Quantization of . . . ," *Information Sciences*, 39, 285–298 (1986).

Kollias, et al., "A Unified Neural Network Approach to Digital Image Halftoning," *IEEE Trans. on Signal Processing*, vol. 39, No. 4, Apr. 1991, pp. 980–984.

Lawson, "Exposing and Processing Screenless Printing Plates," *1978 Proc. of the Technical Assoc. of the Graphic Arts*, pp. 45–49.

Mannos, et al., "The Effects of a Visual Fidelity Criterion on the Encoding of Images," *IEEE Transaction on Information Theory*, vol. IT-20, No. 4, Jul. 1974.

Quick, "System Theory and Vision: A Review of Models and Applications," *Proceedings of the SID*, vol. 21/3, 1980, pp. 209–217.

Sullivan, et al., "New Algorithm for Image Halftoning Using a Human Visual Model," *Advanced Printing of Conference Summaries*, May 20–25, 1990, pp. 145–148.

Ulichney, "Dithering with Blue Noise," *Proc. of the IEEE*, vol. 76, No. 1, Jan. 1988, pp. 56–79.

$T_{-2,1}\ T_{-2,2}\ T_{-2,3}\ T_{-2,4}\ T_{-2,5}\ T_{-2,6}\ T_{-2,7}\ T_{-2,8}\ T_{-2,9}\ T_{-2,10}$
$T_{-1,1}\ T_{-1,2}\ T_{-1,3}\ T_{-1,4}\ T_{-1,5}\ T_{-1,6}\ T_{-1,7}\ T_{-1,8}\ T_{-1,9}\ T_{-1,10}$
$T_{0,1}\ T_{0,2}\ T_{0,3}\ T_{0,4}\ T_{0,5}\ T_{0,6}\ T_{0,7}\ T_{0,8}\ T_{0,9}\ T_{0,10}$
$T_{1,1}\ T_{1,2}\ T_{1,3}\ T_{1,4}\ T_{1,5}\ T_{1,6}\ T_{1,7}\ T_{1,8}\ T_{1,9}\ T_{1,10}$
$T_{2,1}\ T_{2,2}\ T_{2,3}\ T_{2,4}\ T_{2,5}\ T_{2,6}\ T_{2,7}\ T_{2,8}\ T_{2,9}\ T_{2,10}$
$T_{3,1}\ T_{3,2}\ T_{3,3}\ T_{3,4}\ T_{3,5}\ T_{3,6}\ T_{3,7}\ T_{3,8}\ T_{3,9}\ T_{3,10}$
$T_{4,1}\ T_{4,2}\ T_{4,3}\ T_{4,4}\ T_{4,5}\ T_{4,6}\ T_{4,7}\ T_{4,8}\ T_{4,9}\ T_{4,10}$ $$
\begin{array}{cccccccccc}
C_{1,1} & C_{1,2} & C_{1,3} & C_{1,4} & C_{1,5} & C_{1,6} & C_{1,7} & C_{1,8} & C_{1,9} & C_{1,10} \\
C_{2,1} & C_{2,2} & C_{2,3} & C_{2,4} & C_{2,5} & C_{2,6} & C_{2,7} & C_{2,8} & C_{2,9} & C_{2,10} \\
C_{3,1} & C_{3,2} & C_{3,3} & C_{3,4} & C_{3,5} & C_{3,6} & C_{3,7} & C_{3,8} & C_{3,9} & C_{3,10} \\
C_{4,1} & C_{4,2} & C_{4,3} & C_{4,4} & C_{4,5} & C_{4,6} & C_{4,7} & C_{4,8} & C_{4,9} & C_{4,10} \\
C_{5,1} & C_{5,2} & C_{5,3} & C_{5,4} & C_{5,5} & C_{5,6} & C_{5,7} & C_{5,8} & C_{5,9} & C_{5,10} \\
C_{6,1} & C_{6,2} & C_{6,3} & C_{6,4} & C_{6,5} & C_{6,6} & C_{6,7} & C_{6,8} & C_{6,9} & C_{6,10} \\
C_{7,1} & C_{7,2} & C_{7,3} & C_{7,4} & C_{7,5} & C_{7,6} & C_{7,7} & C_{7,8} & C_{7,9} & C_{7,10} \\
C_{8,1} & C_{8,2} & C_{8,3} & C_{8,4} & C_{8,5} & C_{8,6} & C_{8,7} & C_{8,8} & C_{8,9} & C_{8,10} \\
C_{9,1} & C_{9,2} & C_{9,3} & C_{9,4} & C_{9,5} & C_{9,6} & C_{9,7} & C_{9,8} & C_{9,9} & C_{9,10} \\
C_{10,1} & C_{10,2} & C_{10,3} & C_{10,4} & C_{10,5} & C_{10,6} & C_{10,7} & C_{10,8} & C_{10,9} & C_{10,10}
\end{array}
$$

| | | | | | | |
|---|---|---|---|---|---|---|
| $C_{-2,13}$ | $C_{-1,13}$ | $C_{0,13}$ | $C_{1,13}$ | $C_{2,13}$ | $C_{3,13}$ | $C_{4,13}$ | $C_{5,13}$ |
| $C_{-2,12}$ | $C_{-1,12}$ | $C_{0,12}$ | $C_{1,12}$ | $C_{2,12}$ | $C_{3,12}$ | $C_{4,12}$ | $C_{5,12}$ |
| $C_{-2,11}$ | $C_{-1,11}$ | $C_{0,11}$ | $C_{1,11}$ | $C_{2,11}$ | $C_{3,11}$ | $C_{4,11}$ | $C_{5,11}$ |
| $C_{-2,10}$ | $C_{-1,10}$ | $C_{0,10}$ | $C_{1,10}$ | $C_{2,10}$ | $C_{3,10}$ | $C_{4,10}$ | $C_{5,10}$ |
| $C_{-2,9}$ | $C_{-1,9}$ | $C_{0,9}$ | $C_{1,9}$ | $C_{2,9}$ | $C_{3,9}$ | $C_{4,9}$ | $C_{5,9}$ |
| $C_{-2,8}$ | $C_{-1,8}$ | $C_{0,8}$ | $C_{1,8}$ | $C_{2,8}$ | $C_{3,8}$ | $C_{4,8}$ | $C_{5,8}$ |
| $C_{-2,7}$ | $C_{-1,7}$ | $C_{0,7}$ | $C_{1,7}$ | $C_{2,7}$ | $C_{3,7}$ | $C_{4,7}$ | $C_{5,7}$ |
| $C_{-2,6}$ | $C_{-1,6}$ | $C_{0,6}$ | $C_{1,6}$ | $C_{2,6}$ | $C_{3,6}$ | $C_{4,6}$ | $C_{5,6}$ |
| $C_{-2,5}$ | $C_{-1,5}$ | $C_{0,5}$ | $C_{1,5}$ | $C_{2,5}$ | $C_{3,5}$ | $C_{4,5}$ | $C_{5,5}$ |
| $C_{-2,4}$ | $C_{-1,4}$ | $C_{0,4}$ | $C_{1,4}$ | $C_{2,4}$ | $C_{3,4}$ | $C_{4,4}$ | $C_{5,4}$ |
| $C_{-2,3}$ | $C_{-1,3}$ | $C_{0,3}$ | $C_{1,3}$ | $C_{2,3}$ | $C_{3,3}$ | $C_{4,3}$ | $C_{5,3}$ |
| $C_{-2,2}$ | $C_{-1,2}$ | $C_{0,2}$ | $C_{1,2}$ | $C_{2,2}$ | $C_{3,2}$ | $C_{4,2}$ | $C_{5,2}$ |
| $C_{-2,1}$ | $C_{-1,1}$ | $C_{0,1}$ | $C_{1,1}$ | $C_{2,1}$ | $C_{3,1}$ | $C_{4,1}$ | $C_{5,1}$ |
| $C_{-2,0}$ | $C_{-1,0}$ | $C_{0,0}$ | $C_{1,0}$ | $C_{2,0}$ | $C_{3,0}$ | $C_{4,0}$ | $C_{5,0}$ |
| $C_{-2,-1}$ | $C_{-1,-1}$ | $C_{0,-1}$ | $C_{1,-1}$ | $C_{2,-1}$ | $C_{3,-1}$ | $C_{4,-1}$ | $C_{5,-1}$ |
| $C_{-2,-2}$ | $C_{-1,-2}$ | $C_{0,-2}$ | $C_{1,-2}$ | $C_{2,-2}$ | $C_{3,-2}$ | $C_{4,-2}$ | $C_{5,-2}$ |

FIGURE 8

| | | | | | | | | | | | | | | | |
|---|---|---|---|---|---|---|---|---|---|---|---|---|---|---|---|
| $B_{-2,-2}$ | $B_{-2,-1}$ | $B_{-2,0}$ | $B_{-2,1}$ | $B_{-2,2}$ | $B_{-2,3}$ | $B_{-2,4}$ | $B_{-2,5}$ | $B_{-2,6}$ | $B_{-2,7}$ | $B_{-2,8}$ | $B_{-2,9}$ | $B_{-2,10}$ | $B_{-2,11}$ | $B_{-2,12}$ | $B_{-2,13}$ |
| $B_{-1,-2}$ | $B_{-1,-1}$ | $B_{-1,0}$ | $B_{-1,1}$ | $B_{-1,2}$ | $B_{-1,3}$ | $B_{-1,4}$ | $B_{-1,5}$ | $B_{-1,6}$ | $B_{-1,7}$ | $B_{-1,8}$ | $B_{-1,9}$ | $B_{-1,10}$ | $B_{-1,11}$ | $B_{-1,12}$ | $B_{-1,13}$ |
| $B_{0,-2}$ | $B_{0,-1}$ | $B_{0,0}$ | $B_{0,1}$ | $B_{0,2}$ | $B_{0,3}$ | $B_{0,4}$ | $B_{0,5}$ | $B_{0,6}$ | $B_{0,7}$ | $B_{0,8}$ | $B_{0,9}$ | $B_{0,10}$ | $B_{0,11}$ | $B_{0,12}$ | $B_{0,13}$ |
| $B_{1,-2}$ | $B_{1,-1}$ | $B_{1,0}$ | $B_{1,1}$ | $B_{1,2}$ | $B_{1,3}$ | $B_{1,4}$ | $B_{1,5}$ | $B_{1,6}$ | $B_{1,7}$ | $B_{1,8}$ | $B_{1,9}$ | $B_{1,10}$ | $B_{1,11}$ | $B_{1,12}$ | $B_{1,13}$ |
| $B_{2,-2}$ | $B_{2,-1}$ | $B_{2,0}$ | $B_{2,1}$ | $B_{2,2}$ | $B_{2,3}$ | $B_{2,4}$ | $B_{2,5}$ | $B_{2,6}$ | $B_{2,7}$ | $B_{2,8}$ | $B_{2,9}$ | $B_{2,10}$ | $B_{2,11}$ | $B_{2,12}$ | $B_{2,13}$ |
| $B_{3,-2}$ | $B_{3,-1}$ | $B_{3,0}$ | $B_{3,1}$ | $B_{3,2}$ | $B_{3,3}$ | $B_{3,4}$ | $B_{3,5}$ | $B_{3,6}$ | $B_{3,7}$ | $B_{3,8}$ | $B_{3,9}$ | $B_{3,10}$ | $B_{3,11}$ | $B_{3,12}$ | $B_{3,13}$ |
| $B_{4,-2}$ | $B_{4,-1}$ | $B_{4,0}$ | $B_{4,1}$ | $B_{4,2}$ | $B_{4,3}$ | $B_{4,4}$ | $B_{4,5}$ | $B_{4,6}$ | $B_{4,7}$ | $B_{4,8}$ | $B_{4,9}$ | $B_{4,10}$ | $B_{4,11}$ | $B_{4,12}$ | $B_{4,13}$ |
| $B_{5,-2}$ | $B_{5,-1}$ | $B_{5,0}$ | $B_{5,1}$ | $B_{5,2}$ | $B_{5,3}$ | $B_{5,4}$ | $B_{5,5}$ | $B_{5,6}$ | $B_{5,7}$ | $B_{5,8}$ | $B_{5,9}$ | $B_{5,10}$ | $B_{5,11}$ | $B_{5,12}$ | $B_{5,13}$ |

FIGURE 14
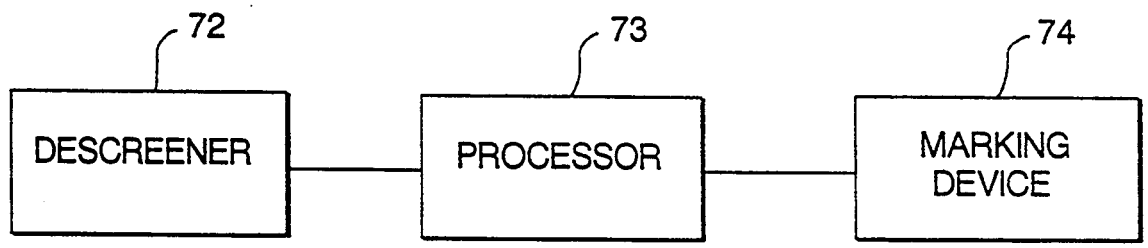
FIGURE 15
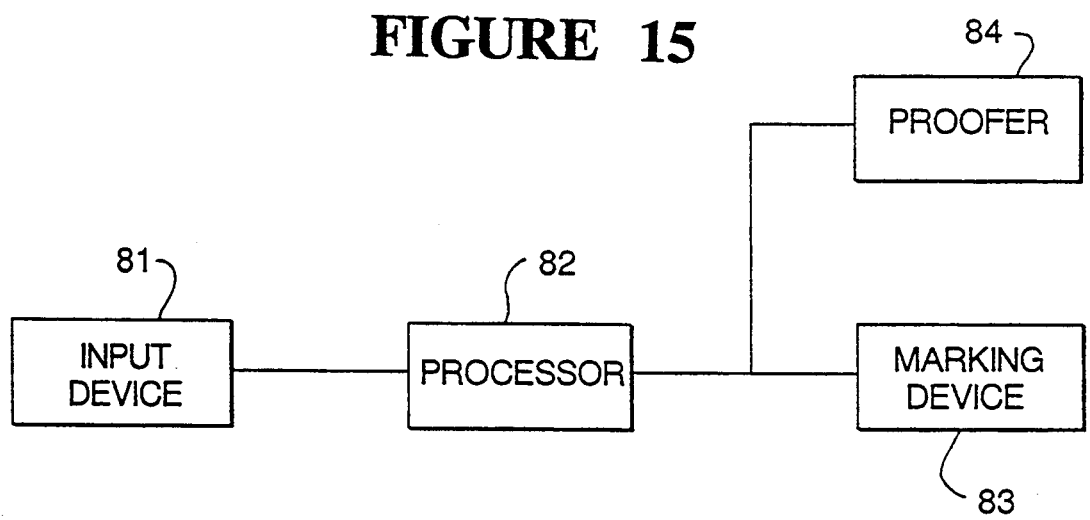
FIGURE 11
−0.0156, 0.0535, 0.2636, 0.397, 0.2636, 0.0535, −0.0156

FIGURE 12

|    | A | B | C | D | E | F | G | H | I | J |
|----|---|---|---|---|---|---|---|---|---|---|
| 1  | 1 |   | 0 |   | 1 |   | 1 |   | 0 |   |
| 2  |   |   |   |   |   |   |   |   |   |   |
| 3  | 0 |   | 1 |   | 1 |   | 0 |   | 1 |   |
| 4  |   |   |   |   |   |   |   |   |   |   |
| 5  | 1 |   | 1 |   | 1 |   | 0 |   | 0 |   |
| 6  |   |   |   |   |   |   |   |   |   |   |
| 7  | 1 |   | 0 |   | 0 |   | 0 |   | 1 |   |
| 8  |   |   |   |   |   |   |   |   |   |   |
| 9  | 0 |   | 0 |   | 0 |   | 0 |   | 1 |   |
| 10 |   |   |   |   |   |   |   |   |   |   |

FIGURE 13

|    | A | B | C | D | E | F | G | H | I | J |
|----|---|---|---|---|---|---|---|---|---|---|
| 1  | 1 | 1 | 0 | 0 | 1 | 1 | 1 | 1 | 0 | 0 |
| 2  | 1 | 1 | 0 | 0 | 1 | 1 | 1 | 1 | 0 | 0 |
| 3  | 0 | 0 | 1 | 1 | 1 | 1 | 0 | 0 | 1 | 1 |
| 4  | 0 | 0 | 1 | 1 | 1 | 1 | 0 | 0 | 1 | 1 |
| 5  | 1 | 1 | 1 | 1 | 1 | 1 | 0 | 0 | 0 | 0 |
| 6  | 1 | 1 | 1 | 1 | 1 | 1 | 0 | 0 | 0 | 0 |
| 7  | 1 | 1 | 0 | 0 | 0 | 0 | 0 | 0 | 1 | 1 |
| 8  | 1 | 1 | 0 | 0 | 0 | 0 | 0 | 0 | 1 | 1 |
| 9  | 0 | 0 | 0 | 0 | 0 | 0 | 0 | 0 | 1 | 1 |
| 10 | 0 | 0 | 0 | 0 | 0 | 0 | 0 | 0 | 1 | 1 |

ELECTRONIC HIGH-FIDELITY SCREENLESS CONVERSION SYSTEM AND METHOD USING A SEPARABLE FILTER

FIELD OF THE INVENTION

The present invention relates to the conversion of input values into output values and, more particularly, to the use of a separable filter in the conversion of continuous tone values into output values representing dots which can be used in the reproduction of an original.

BACKGROUND OF THE INVENTION

In lithographic printing systems, an original to be reproduced is scanned by a scanner on a pixel-by-pixel basis and the resulting scanned values are used to create one or more printing plates. When a monochrome (e.g., black and white) reproduction is to be printed, a single printing plate is produced. On the other hand, when a color reproduction is to be printed, a set of four plates are produced, one for each of the subtractive primary colors of magenta, cyan and yellow and one for black. The colored inks reproduce the hues of the original and the black ink produces a desired neutral density that cannot be attained by colored inks alone. In addition, since black ink is less expensive than colored inks, grey replacement (a form of undercolor removal) may be effected to replace quantities of the colored inks with black ink. Such a process reduces the cost to produce the reproduction without significantly affecting the appearance thereof.

In traditional prior art lithographic half-tone reproduction systems, each printing plate includes a number of contiguous cells of equal size wherein each cell contains zero, one, or more elementary marks (or "microdots") clustered together to form a single large "dot" in the cell. More recently, systems have been devised wherein microdots are dispersed in a regular pattern in each cell. In other systems, microdots are dispersed in a random pattern on a medium. In each system, the number of elementary marks used to create a cluster dot or a dispersed dot depends upon the amount of ink to be applied to the substrate at the cell location. This is, in turn, dependent upon the scanned value of the original at a corresponding location thereof.

In the past, dots were formed within cells on a regular spacing or grid using a screen in a photochemical etching process. More recently, half-tone reproduction systems have utilized data processing equipment that electronically produces data representing a half-tone image. This data can be used to plot film or to directly form a printing plate without the use of an actual screen. However, the terms "screen" and "screening" are still used to define the dot pattern produced in a half-tone reproduction. For example, the term "screen ruling" specifies the distance between centers of adjacent cells of the plate. When the cells are all of the same size and regularly spaced, the plate is said to have a "regular screening". In such a case, a cell contains one period of the "screen".

Systems that reproduce half-tone images with regular screening have several drawbacks. For example, resolution is limited by screen ruling. Screen ruling is limited, in turn, by the minimum dot size and spacing that can be reliably and consistently printed. Moreover, regular dot patterns produced by regular screening in color reproduction result in moire' effects and color shifts caused by interference between the superimposed dot patterns. Such undesirable artifacts have been reduced in the past by superimposing the screens at angles with respect to one another. However, this technique is not entirely satisfactory since undesired effects are only minimized, not eliminated completely.

The prior art has reduced the effects of moire' and color shifts while at the same time enhancing the quality of the reproduction by eliminating the use of regular screens. Instead, a process known as "screenless" lithography (also referred to as random screening or random dot lithography) has been used to produce irregular dot patterns on the printed page. The use of irregular dot patterns can eliminate visual interference caused by superimposition of the dot patterns, and hence moire' effects are substantially reduced or eliminated.

In one prior art system, a printing plate having an irregular grain structure is photographically exposed and chemically developed in a photolithographic process to produce an irregular dot structure. Such systems, however, cannot create consistent dot patterns from plate to plate.

Random screening has been electronically achieved utilizing an error diffusion technique, such as that described by Floyd and Steinberg in their paper "An Adaptive Algorithm for Spatial Greyscale", *Proceeding of the S.I.D.*, Vol. 17/2, Second Quarter 1976. This paper discloses a reproduction system that compares each continuous tone value, obtained by scanning an original, with a threshold to obtain a binary approximation of the continuous tone value. When the continuous tone value is less than the threshold, the continuous tone value is converted to a binary value of zero. If the continuous tone value is greater than the threshold, the continuous tone value is converted to a binary value of one. After conversion, the error resulting from approximation of the continuous tone value is subdivided into error portions and the error portions are summed in a prescribed pattern with neighboring continuous tone values yet to be converted so that such error is diffused. Each continuous tone value to be converted is thus a combination of its original continuous tone value plus any error portions diffused to it by the conversion of neighboring, previously converted continuous tone values. The next continuous tone value to be converted is then compared to the threshold and converted to one of the binary values. The resulting error, if any, is diffused to neighboring continuous tone values yet to be converted. This process is repeated until all continuous tone values resulting from scanning of the original have been converted to binary values. The binary values thus derived are used to produce a printing plate having dots at locations defined by such values.

While the foregoing process is effective to reproduce half-tone images with random dots, it has been found that the dots create artifacts in the reproduction. These artifacts detract from the visual appearance of the reproduction. Sullivan, U.S. Pat. No. 5,051,844, discloses an error diffusion conversion system wherein a blur filter simulating the human visual system is utilized to reduce the incidents of artifacts in the reproduction. In this system, the filter comprises an array of filter elements or numbers, one of which is multiplied with an assumed binary value of zero for the continuous tone value undergoing conversion and the remaining of which are multiplied with binary values representing continuous tone values that have already been converted. The resulting values are subtracted from the continuous tone value undergoing conversion to produce a first error. A second error is produced in the same fashion, except that the one filter element is multiplied with an assumed binary value of one for the continuous tone value undergoing conversion. If the magnitude of the first error is less than the magnitude of the second error, the continuous tone value undergoing conversion is converted to a binary value of zero. Otherwise, the value is converted to a binary value of one. The error resulting from conversion of the continuous tone value is then diffused in a predetermined manner to neighboring continuous tone values that have not yet been converted.

The Sullivan system, therefore, applies a blur filter approximating the human eye to simulate a retrospective spatial view of converted continuous tone values in order to reduce perceived errors which would otherwise result. This system, however, fails to take a prospective spatial view of the conversion process into account, and it cannot eliminate visible artifacts completely.

The conversion system disclosed in Xie, et al., U.S. patent application Ser. No. 07/775,334, entitled "Electronic High-Fidelity Screenless Conversion System" assigned to the assignee of the instant application further reduces perception errors and visible artifacts by simulating a prospective spatial view, as well as a retrospective spatial view, in the conversion of each continuous tone value to a corresponding output value. That conversion system generates first and second errors by applying a filter to first and second sets of output values corresponding to continuous tone values in the neighborhood surrounding each continuous tone value undergoing conversion. More specifically, the first set includes (a) output values corresponding to a selected number of previously converted continuous tone values (the "retrospective spatial view output values"), (b) predicted or estimated output values corresponding to a selected number of continuous tone values yet to be converted (the "prospective spatial view output values"), and (c) an assumed output value of zero for the continuous tone value undergoing conversion. The second set includes the retrospective and prospective spatial view output values as well as an assumed output value of one for the continuous tone value undergoing conversion. If the absolute value of the first error is less than the absolute value of the second error, then the continuous tone value undergoing conversion is converted to an output value of zero. Otherwise, the continuous tone value is converted to an output value of one.

SUMMARY OF THE INVENTION

In accordance with the present invention, a filter based upon the human visual system is not employed in the conversion process. Rather, noise arising in the reproduction process is removed by a simple, separable filter. As compared with the Sullivan and Xie, et al. systems described above, a separable filter requires far fewer calculations in order to convert an input value into an output value even though the same number of neighboring values may be used in the conversion process. Thus, computational overhead and processing times are reduced.

More particularly, a system, for converting one of a series of input values into an output value, wherein previous input values have been converted to previous output values and subsequent input values are to be converted to output values, includes means for generating first and second errors for the input value undergoing conversion. The first error is based upon application of a separable filter to a selected number of previous output values, to output values predicted for a certain number of subsequent input values, and to an output value having an assumed first level for the one input value undergoing conversion. The second error is based upon application of the separable filter to the selected number of previous output values, to the output values predicted for the certain number of subsequent input values, and to an output value having an assumed second level for the input value undergoing conversion. Means are provided for setting the input value undergoing conversion to an output value having the first level if the first error is less than the second error and to an output value having the second level if the first error is greater than the second error.

Preferably, the output value setting means includes means for diffusing the first error to a selected number of subsequent input values if the input value undergoing conversion is converted to the output value having the first level and for diffusing the second error to a selected number of subsequent input values if the input value undergoing conversion is converted to the output value having the second level.

Also in accordance with this aspect of the present invention, the error generating means preferably includes means for comparing each of the certain number of subsequent input values to a threshold, means responsive to the comparing means for converting each of the certain number of subsequent input values to a corresponding predicted output value having the first level or the second level depending upon whether the subsequent input value is above or below the threshold, and means for diffusing a difference between each of the certain number of subsequent input values and the predicted output value corresponding thereto to other subsequent input values. In accordance with alternative embodiments, the threshold may be fixed or random. Also, the difference diffusing means preferably diffuses the difference in a serpentine manner.

Also in accordance with this aspect of the present invention, means are provided for sampling an original at a first resolution to obtain sampled values and the error generating means further includes digital resampling means responsive to the developing means for increasing the resolution of the sampled values to a second resolution greater than the first resolution to obtain the series of input values. Since conversion of the sampled values at this second, greater resolution tends to increase the bandwidth of the sampled values beyond the original bandwidth of the sampled values before resampling and conversion, the separable filter is preferably of the low pass type that limits the output values to the original bandwidth of the sampled values.

In accordance with a further aspect of the present invention, a method of converting input values to corresponding output values wherein an input value undergoing conversion has before it previously converted input values and after it input values yet to be converted and wherein each of the input values has one of at least M possible levels and each of the output values has one of at least N possible levels, where M is greater than N, includes the steps of using a separable filter to generate N errors each of which is based upon a corresponding one of the N possible levels, of converting the input value undergoing conversion to an output value which corresponds to the smallest error, and of diffusing the smallest error to a predetermined number of input values yet to be converted. The foregoing steps are repeated for each of the input values yet to be converted.

BRIEF DESCRIPTION OF THE DRAWINGS

These and other features and advantages will become more apparent from a detailed consideration of the invention when taken in conjunction with the drawings in which:

FIG. 4 illustrates an example of a separable filter which may be used in the system and method of the present invention;

FIG. 5 illustrates an example of continuous tone values to be converted according to the present invention;

FIG. 7 illustrates how the first row and the first and last columns of the continuous tone values of FIG. 5 corresponding to edges of an original may be duplicated so that continuous tone values resulting from scanning the edges of the original may be converted;

FIG. 8 illustrates predicted binary values resulting from the application of error diffusion to the continuous tone values of FIG. 7 in order to provide initial binary values at the start of the conversion method;

FIG. 10 illustrates intermediate T values generated during the conversion of continuous tone values to output values;

FIG. 11 illustrates an example of actual filter values which may be used for the separable filter of the present invention;

FIG. 12 illustrates an example of binary values resulting from screenless conversion;

FIG. 13 illustrates the values of FIG. 12 after duplication thereof;

FIG. 14 comprises a block diagram of the screenless conversion system according to the present invention in connection with a descreener; and FIG. 15 comprises a block diagram of the screenless conversion system according to the present invention in connection with a proofer.

DESCRIPTION OF THE PREFERRED EMBODIMENTS

Figure 1A:
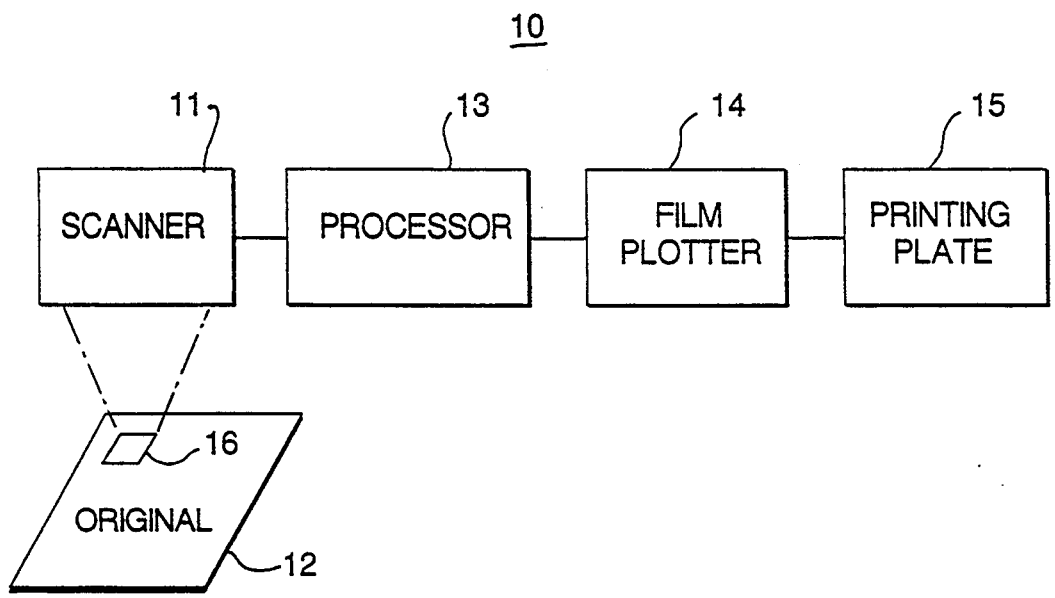
FIGS. 1A and 1B comprise block diagrams illustrating two environments in which the present invention can be used.

As shown in FIG. 1A, the present invention is particularly useful as part of an image reproduction system 10. The reproduction system 10 includes a scanner 11 which scans or samples each pixel, such as a pixel 16, of an original 12. The original 12 may consist of a pictorial image and line work wherein the line work may include textual material. Each pixel of the original 12 is converted by the scanner 11 into an eight-bit digitized continuous tone value which is supplied to, and stored in, a memory (not shown in FIG. 1A or FIG. 1B) of a processor 13. (This eight bit digitized continuous tone value may also be referred to as an input value.) Since eight bits are used, each continuous tone value has an amplitude resolution of 256 different levels. The processor 13 converts the continuous tone values into output values which, in the preferred embodiment, have only two levels, and hence are referred to as half-tone binary values. These half-tone binary values are stored in the memory and are then used by a film plotter 14 to plot a film which in turn is used by a block 15 to create a printing plate.

Figure 1B:
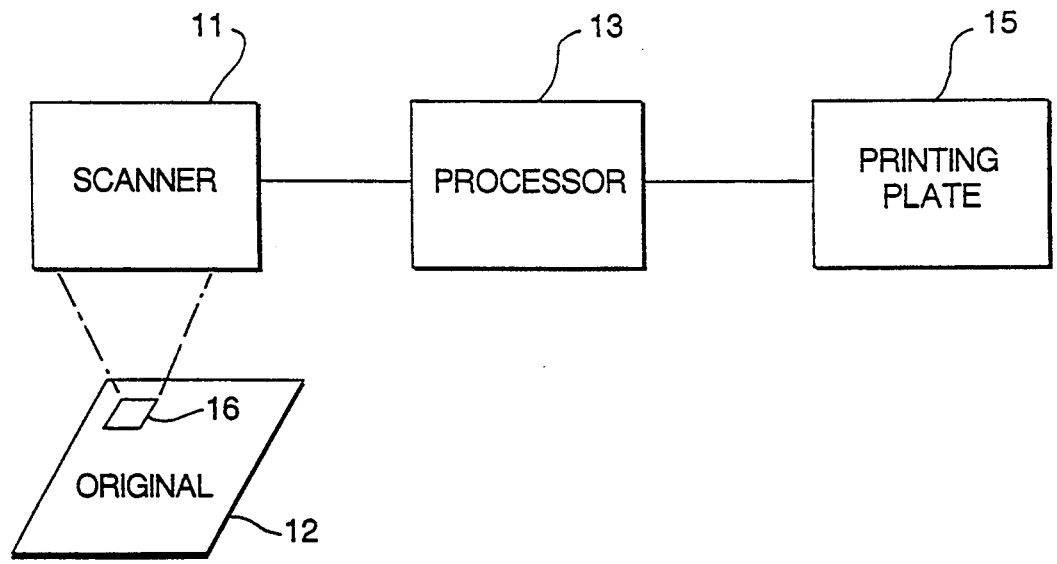

Alternatively, as shown in FIG. 1B, the half-tone binary values can be used directly in the formation of printing plates without the necessity of first creating a film from the half-tone binary values and then using the film to form the plates.

The printing plate, whether created directly or by film, can then be used in a printer, such as an offset printer, for reproducing the original 12.

For ease in understanding the present invention, it is useful to envision the continuous tone values and the half-tone binary values as forming first and second arrays in the processor memory, although the data need not be physically stored as such. The location of each half-tone binary value in the second array is used to determine the location of a potential elementary mark (or microdot), and the specific value of the half-tone binary value determines whether or not a mark is printed on the film or formed directly on the plate at that location. The array of binary half-tone values as a whole defines a pattern of elementary marks to be plotted on the film or directly on the plate and this pattern will result in reproduction of the original when printed.

If the original 12 is to be reproduced using only one ink, e.g. black, the processor 13 stores and supplies only one set of binary values. The number of elementary marks in a given area controls the amount of grayness in that area of the reproduced image, and the pattern of elementary marks represents the image and line work of the original. In the event the system is used for color reproduction, the scanner 11 uses color filters to produce three arrays or sets of continuous tone values, one for each of the three primary additive colors red, green and blue. If the three arrays representing the three primary additive colors have not already been translated to four arrays representing the four printing colors of cyan, magenta, yellow and black, the processor 13 will do so. The processor 13 converts each array of continuous tone values to a corresponding array of half-tone binary values. The film plotter 14 then uses each array to plot a separate film for each of the printing colors, or each array is used directly to form a separate printing plate for each of the printing colors. During printing, as is well known, each printing plate separately lays down its associated color on the paper or substrate on which the original is being reproduced. The colors are combined by the human visual system to reproduce the colors of the original 12.

Figure 2:
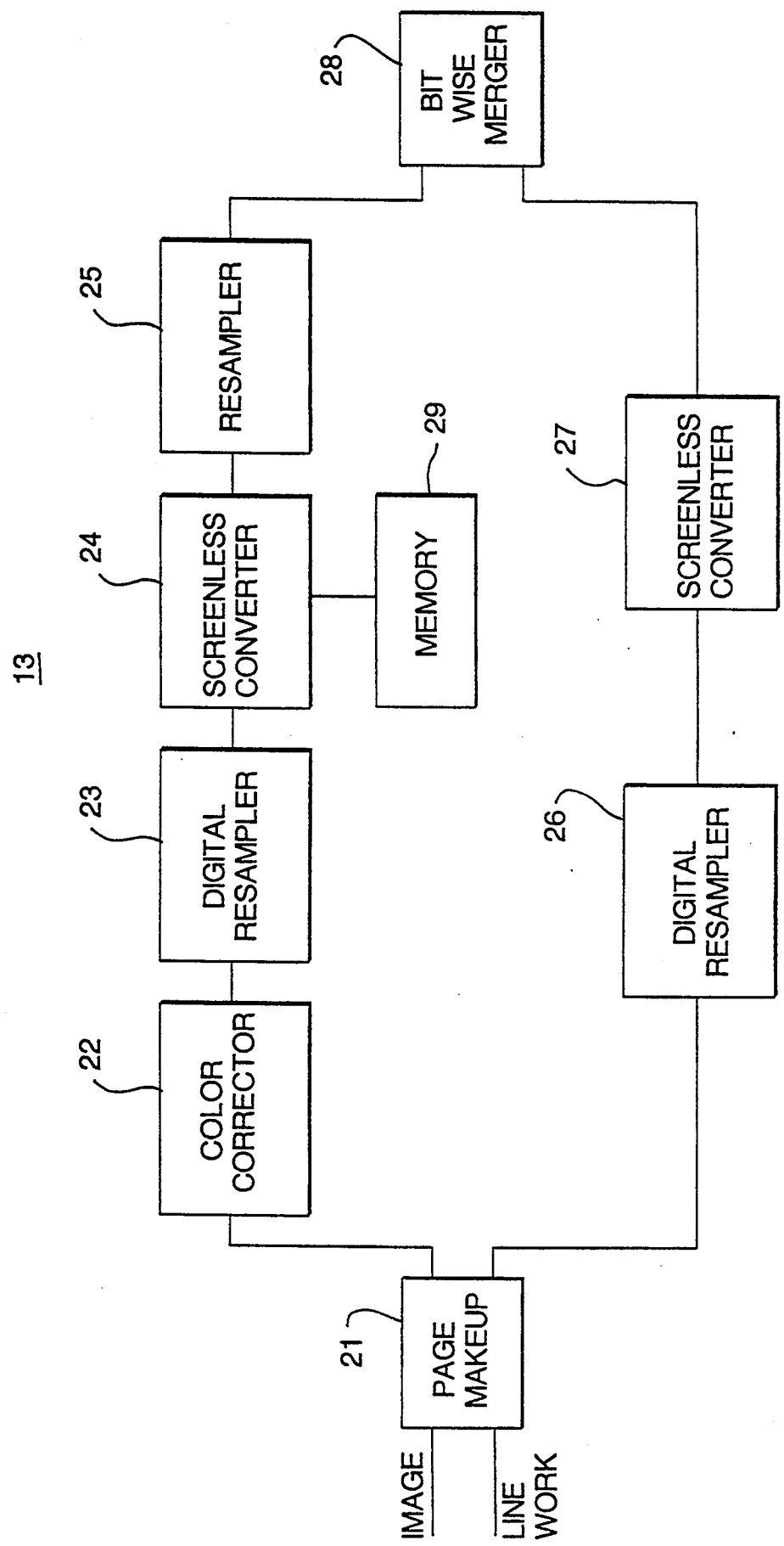
FIG. 2 comprises a block diagram showing the functions undertaken by the processor of FIGS. 1A and 1B.

The processor 13, which may be in the form of a general purpose computer, performs a number of functions as shown in FIG. 2. The image and line work, represented by signals from the scanner 11, can be combined by a block 21 in order to make up a page as it will appear at reproduction. At this point, the image and line work can be arranged and rearranged by an operator until the page has the desired appearance. From the page makeup block 21, the continuous tone values representing the image are processed along the upper path of FIG. 2 while the line work is processed along the lower path.

Figure 3:
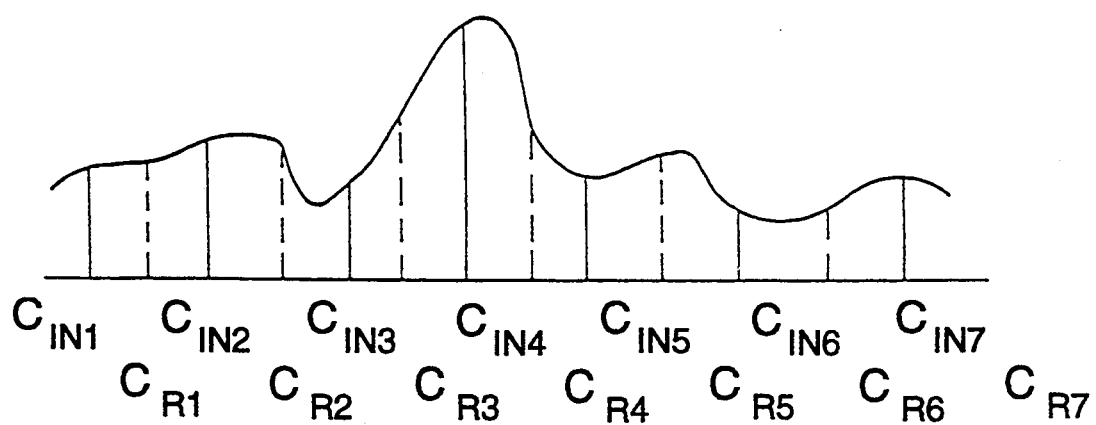
FIG. 3 comprises a graph useful in explaining the digital resampling undertaken by the blocks 23 and 26 of in FIG. 2.

Along the upper path, the image data are supplied to a color corrector 22 where the color is corrected for printing. This color correction, such as that shown in Clark et al U.S. Pat. Nos. 4,477,833 and 4,481,532, assigned to the assignee of the present application and the disclosures of which are incorporated by reference herein, accounts for the different qualities of ink, paper and marking devices (e.g. the film plotter 14), thus providing the capability to substantially match the reproduction to the original. If necessary, the continuous tone values are then digitally resampled by a block 23 after color correction in order to increase the number of such values per inch. This increase is desirable to increase the resolution of the reproduction and may be necessary to match the possibly higher resolution of the marking device. For example, the resolution of the continuous tone values exiting the color corrector 22 may be at 300 elementary marks per inch whereas the continuous tone values exiting the digital resampler 23 may have a resolution of approximately 750 elementary marks per inch The digital resampler 23 includes an interpolator for interpolating between the input continuous tone values supplied to it. As shown in FIG. 3, the solid vertical lines represent input continuous tone values $C_{IN1}$-$C_{IN7}$ and the dashed lines represent interpolated or resampled continuous tone values $C_{R1}$-$C_{R6}$ between the input continuous tone values. After resampling, the continuous tone values to be converted to half-tone values comprise both the input continuous tone values and the interpolated continuous tone values. Although any form of interpolation, such as a straight line interpolation, can be used between adjacent input values, it is preferable to use the interpolation filter disclosed by Goertzel, Mintzer, Thompson and Chin in their Pattern Recognition/Image Processing ITL, Tokyo, conference article of Apr. 16, 1986 entitled "The Design of Interpolation Filters and their Application to Image Scaling and Rotation". The filter disclosed in this article can be used to scale an image, by either increasing or decreasing the number of sampled data, and to rotate the image represented by the sampled data. In connection with the present invention, the filter is used to increase the number of continuous tone values. The filter increases the number of continuous tone values in each row (which has the effect of increasing the number of columns of continuous tone values) and then increases the number of continuous tone values in each column (which has the effect of increasing the number of rows of continuous tone values).

That is, an image may be represented as a function $p(x)$, where $-\infty < x < \infty$. If $p(x)$ is band-limited with a cut-off frequency $f_s/2$, then $p(x)$ may be written $$p(x) = \int_{-f_s/2}^{f_s/2} p(f) e^{i2\pi x f} df. \quad (a)$$

The function $p(x)$ may be completely recovered from uniformly spaced samples resulting from a sampling frequency $f_s$ and having a corresponding spacing as follows:

$$\delta x = \frac{1}{f_s}. \quad (b)$$

In equation (a), P(f) may be expressed as the following Fourier series:

$$P(f) = \frac{1}{f_s} \sum_{k=-\infty}^{\infty} p(k/f_s) e^{i2\pi f k/f_s}. \quad (c)$$

By substituting equation (c) into equation (a), the following equation is obtained:

$$p(x) = \int_{-f_s/2}^{f_s/2} \frac{1}{f_s} \sum_{k=-\infty}^{\infty} p(k/f_s) e^{-i2\pi f k/f_s} e^{i2\pi x f} df \quad (d)$$

$$= \sum_{k=-\infty}^{\infty} p(k/f_s) \frac{1}{f_s} \int_{-f_s/2}^{f_s/2} e^{i2\pi f(x - k/f_s)} df$$

$$= \sum_{k=-\infty}^{\infty} p(k/f_s) \frac{\sin \pi(x f_s - k)}{\pi(x f_s - k)}.$$

Equation (d) may be written as follows:

$$p(x) = \sum_{k=-\infty}^{\infty} u(x - k\delta x) p(k\delta x) \quad (e)$$

where $$u(x) = \frac{\sin \pi(x/\delta x)}{\pi x/\delta x}. \quad (f)$$

The Fourier transform of equation (f) is given by $U(f) = \delta x$ for $-f_s/2 < f < f_s/2$ $U(f) = 0$ otherwise so that $u(x)$ is an ideal low-pass filter with a cut-off frequency at $f_s/2$. This interpolation filter, while exact, is not practical since it contains a slowly converging infinite sum.

However, an interpolation filter, $w(x)$, which is space limited, is low-pass, and has a cutoff frequency $f_c$, may be derived from the above. The larger the spatial range of $w$, the better the filter that may be derived. Spatial ranges which are multiples of $1/f_c$ may be considered where the multiple is denoted by $\lambda$. Thus, $w(x) = 0$ for $|x| \geq \lambda/2f_c$.

Since, $w$ is space-limited, it may be expanded in the following Fourier series:

$$w(x) = \delta f \sum_k W(k\delta f) e^{i2\pi k \delta f x} \quad (g)$$

for $-\lambda/2f_c < x < \lambda/2f_c$ where $\delta f = f_c/\lambda$. The Fourier transform of $w$ may be written as follows:

$$W(f) = \sum_k W(k\delta f) \frac{\sin \pi(k - f/\delta f)}{\pi(k - f/\delta f)}. \quad (h)$$

To design the filter given by equation (h), the values of $W(k\delta f)$ are selected so that the filter has the following properties: (i) low-pass frequency response with cutoff at $f_c$; (ii) accuracy at low frequencies; (iii) high attenuation in the neighborhood of the sampling frequency; and, (iv) falls off as $f^{-3}$ at high frequencies. Item (ii) ensures that the filtered image has uniform gray tones in regions of constant gray. Item (iii) is necessary for the treatment of linearly increasing gray values. Items (iii) and (iv) together greatly diminish unwanted aliases. The coefficients for equation (h) may be given as follows:

$$f_s W(k\delta f) = 1 \text{ for } |k| < \lambda - 1$$

$$f_s W(k\delta f) = 1 - d \text{ for } |k| = \lambda - 1$$

$$f_s W(k\delta f) = 0.5 \text{ for } |k| = \lambda \quad (i)$$

$$f_s W(k\delta f) = d \text{ for } |k| = \lambda + 1$$

$$f_s W(k\delta f) = 0 \text{ for } |k| > \lambda + 1.$$

The value of d is chosen to minimize the response near the sampling frequency $f_s$ so that $$\lim_{f \to f_s} \frac{W(f)}{\sin(\pi f / \delta f)} = 0. \quad (j)$$

The filter described above is used for enlargement with, for example, $\lambda = 5$ and $f_c = f_s/2$. Values of d, for example, may range from 0.08 to 0.12.

In order to scale a line of an image, let $p_k$ represent the input data and $q_n$ represent the output data. Accordingly, the position of an input datum is given by $x = k\delta x$ whereas the position of a desired output datum is given by $x = (n\delta x)/R$. For enlargement, R is greater than 1. The interpolation filter as described above may be used to obtain $q_n$ from $p_k$ as follows:

$$q_n = \sum_k w(n\delta x/R - k\delta x) p_k. \quad (k)$$

Equation (k) is essentially equation (e) which has been modified according to the procedures established by equations (g) through (j) so as to be space limited rather than including a slowly converging infinite sum. The sum given by equation (k) is carried out over all k for which w is not zero. In practice, w may be tabulated with an interval of $0.01\delta x$. To enlarge, first each horizontal line is scaled by enlargement to create a new image. Then each vertical line of the new image is scaled thus yielding the final image.

The resulting continuous tone values are then supplied to a screenless converter 24 which, together with a memory 29, converts these continuous tone values into corresponding half-tone binary values. The screenless converter 24 employs a separable filter, such as that shown in FIG. 4, in the conversion process or method.

The use of the separable filter in the conversion of continuous tone values according to the method of the present invention may be shown in connection with the example of an array of continuous tone values shown in FIG. 5. In actual practice, there will be many more continuous tone values to be converted, but the $10 \times 10$ array shown in FIG. 5 is sufficient for this example. The array is illustrated as having a number of array locations wherein the subscripts indicate the relative array positions of the continuous tone values obtained from the original 12. The first continuous tone value to be converted is the top left-most continuous tone value in location $C_{1,1}$.

The conversion process disclosed herein applies a separable filter to binary values corresponding to previously converted continuous tone values as well as to predicted binary values corresponding to continuous tone values yet to be converted. However, at the start of the conversion process, no continuous tone values have been converted to binary values so that there are no binary values corresponding to previously converted continuous tone values. In order to provide such binary values, the screenless converter 24 initially duplicates certain of the continuous tone values shown in FIG. 5. The number of initially duplicated continuous tone values is dependent upon the size of the filter. In the present case, as shown in FIG. 4, a seven element filter is used.

Figure 6A:
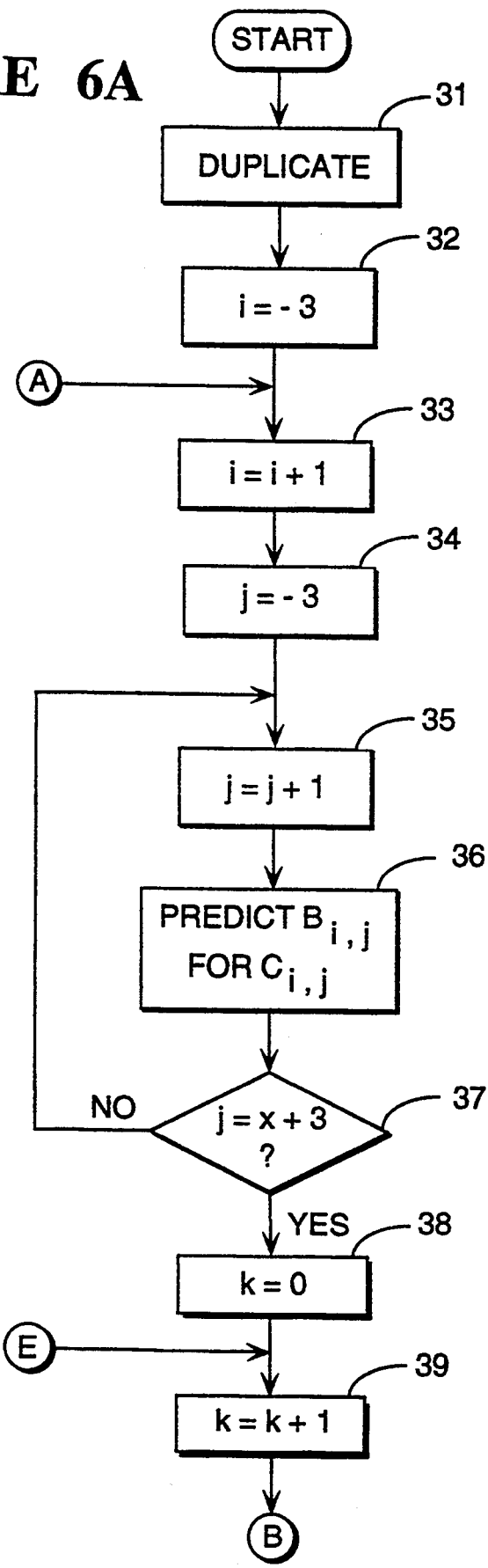
FIGS. 6A through 6C taken together comprise a flowchart of the method of screenless conversion according to the present invention.
Figure 6B:
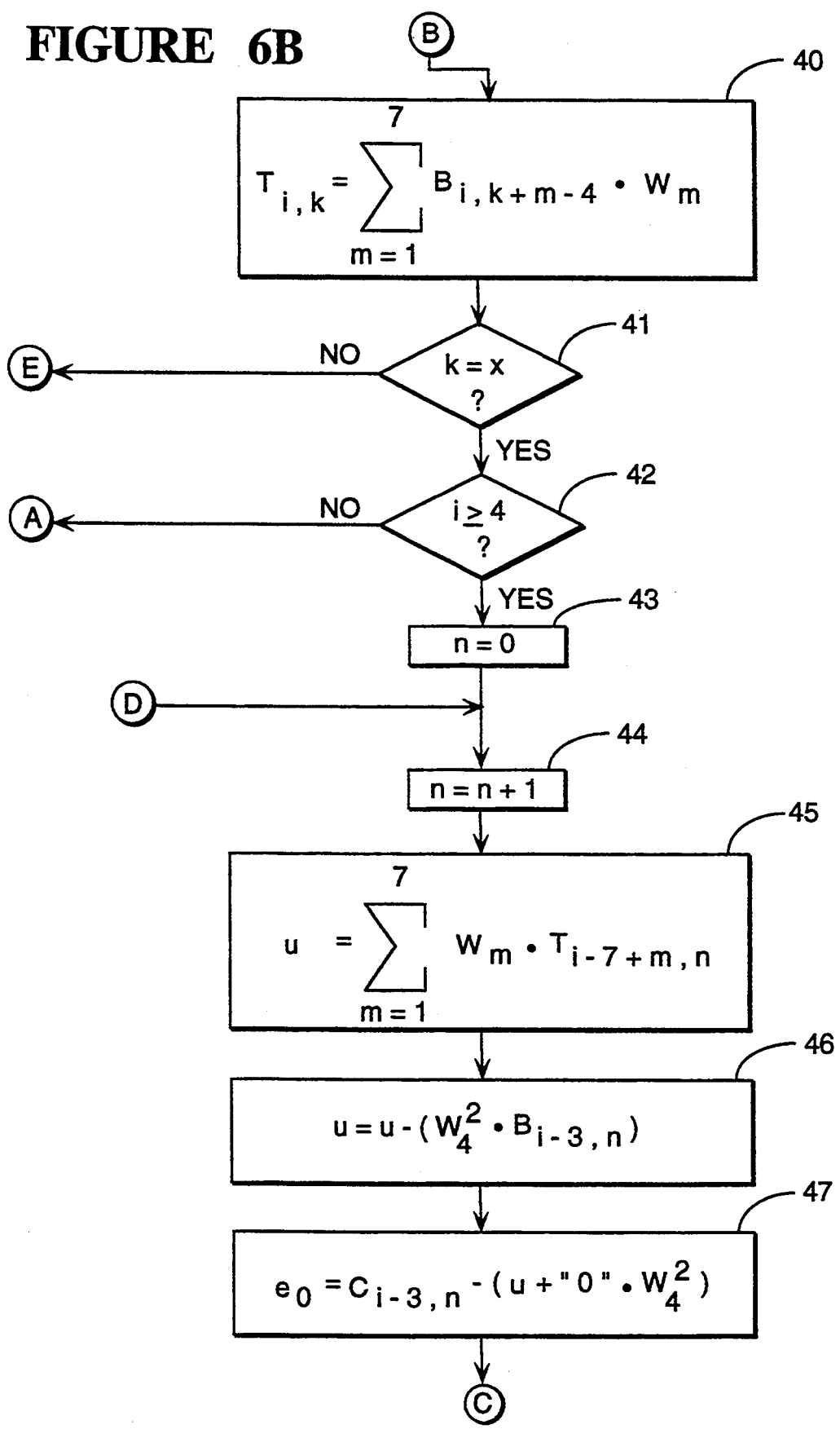
Figure 6C:
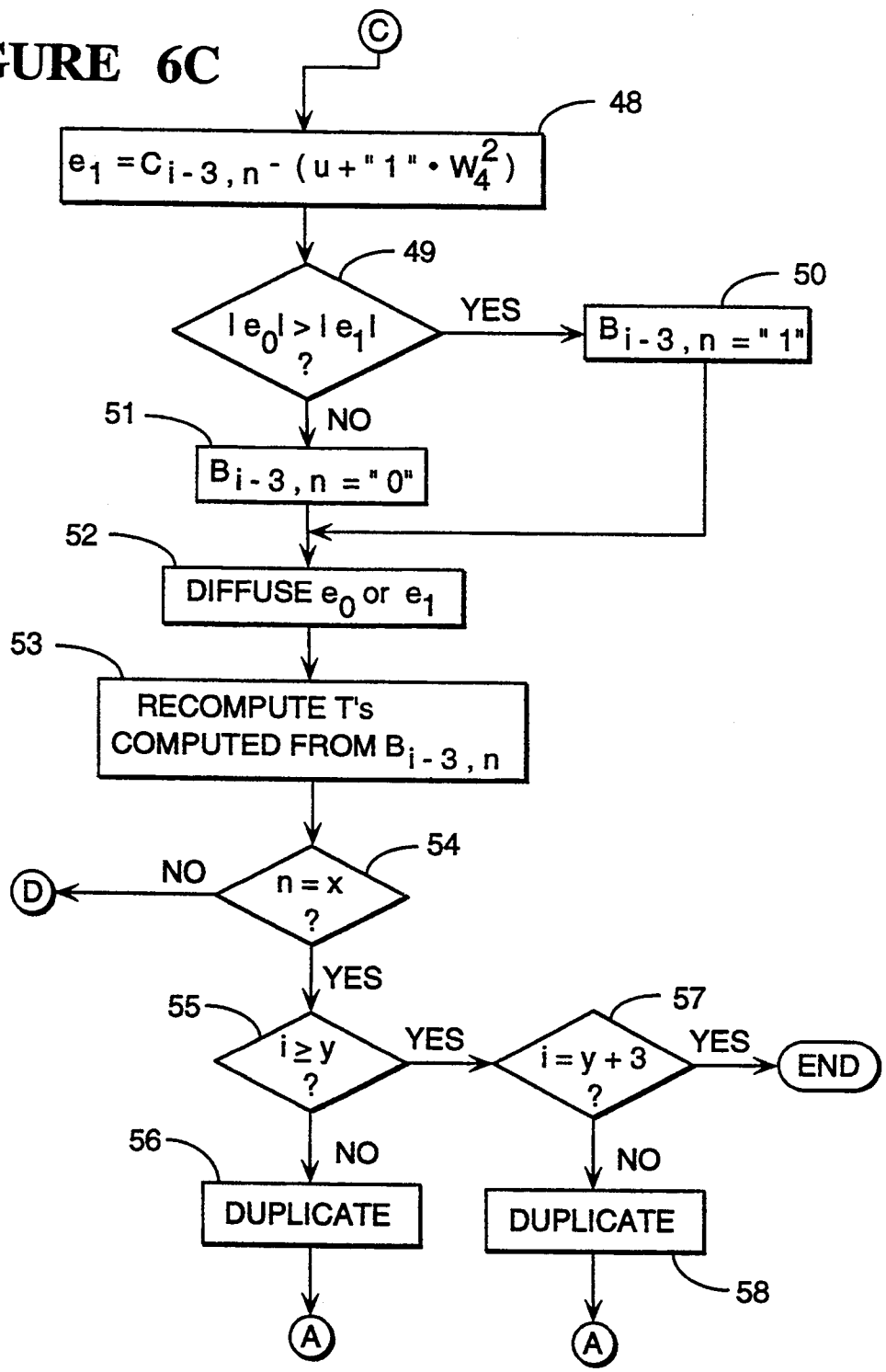

Accordingly, as shown by the flowchart illustrated in FIGS. 6A-6C, the conversion method begins at a block 31, which duplicates the continuous tone values as required to begin the conversion process. More specifically, the continuous tone values in the first row of the array shown in FIG. 5 are duplicated into rows 0, $-1$ and $-2$ as shown in FIG. 7. Thus, the continuous tone value in location $C_{1,1}$ is duplicated into locations $C_{0,1}$, $C_{-1,1}$, and $C_{-21}$, the continuous tone value in location $C_{1,2}$ is duplicated into locations $C_{0,2}$, $C_{-1,2}$, and $C_{-2,2}$, and so on until the continuous tone value in location $C_{1,10}$ is duplicated into locations $C_{0,10}$, $C_{-1,10}$, and $C_{-2,10}$. Next, the first seven continuous tone values in column 1 are duplicated into columns 0, $-1$ and $-2$. Thus, the continuous tone value in location $C_{-2,1}$ is duplicated into locations $C_{-2,0}$, $C_{-2,-1}$, and $C_{-2,-2}$, the continuous tone value in location $C_{-1,1}$ is duplicated into locations $C_{-1,0}$, $C_{-1,-1}$, and $C_{-1,-2}$ and so on until the continuous tone value in location $C_{4,1}$ is duplicated into locations $C_{4,0}$, $C_{4,-1}$, and $C_{4,-2}$. Finally, the first seven continuous tone values in column 10 are duplicated into columns 11, 12 and 13. Thus, the continuous tone value in location $C_{-2,10}$ is duplicated into locations $C_{-2,11}$, $C_{-2,12}$, and $C_{-2,13}$, the continuous tone value in location $C_{-1,10}$ is duplicated into locations $C_{-1,11}$, $C_{-1,12}$, and $C_{-1,13}$, and so on until the continuous tone value in location $C_{4,10}$ is duplicated into locations $C_{4,11}$, $C_{4,12}$, and $C_{4,13}$. The resulting first seven rows of continuous tone values are shown in FIG. 7 with the dashed line enclosing the first four rows of continuous tone values shown in FIG. 5.

In FIG. 6A, a block 32 of the program next sets a variable i equal to a value of $-3$. The variable i represents the row in which a value is located. A block 33 then increments the variable i by 1, and a second variable j is set to a value of $-3$ by a block 34. The variable j is incremented by 1 by a block 35. At this time, therefore, $i = -2$ and $j = -2$. A block 36 then predicts a binary value $B_{-2,2}$ for the continuous tone value in location $C_{-2,-2}$.

Figure 9:
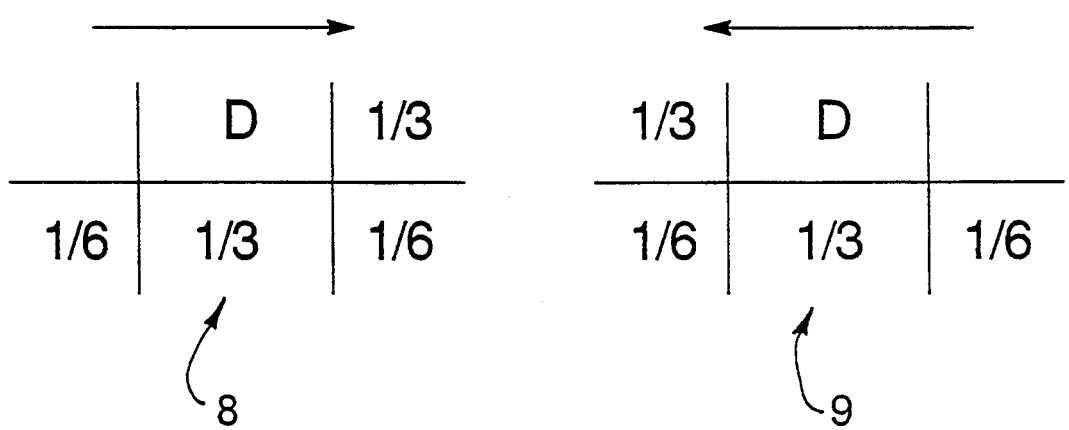
FIG. 9 illustrates two error diffusion patterns useful in conjunction with the present invention.

The block 36 uses a standard error diffusion technique to predict binary values for corresponding continuous tone values. According to this error diffusion technique, the continuous tone value in location $C_{-2,-2}$ is compared to a threshold. Since a continuous tone value may have, for example, a digital value ranging from 0 to 255, it is convenient to compare the continuous tone value to a digital threshold of 128, although any other threshold can be used. If the continuous tone value in location $C_{-2,-2}$ is greater than the threshold, the corresponding binary value in location $B_{-2,-2}$ of FIG. 8 is set to a digital value of 255 (representing a binary "1"). If the continuous tone value in location $C_{-2,-2}$ is below the threshold, the corresponding binary value in location $B_{-2,-2}$ is set to a digital value of zero (representing a binary "0"). Then, the difference between the continuous tone value in location $C_{-2,-2}$ and its corresponding predicted binary value in location $B_{-2,-2}$ is diffused according to diffusion pattern 8 shown in FIG. 9. Specifically, ⅓ of this difference (D) is added to the continuous tone value in location $C_{-2,-1}$, 1/6 of the difference is added to the continuous tone value in location $C_{-1,-1}$, ⅓ of the difference is added to the continuous tone value in location $C_{-1,-2}$, and the remaining 1/6 of the difference is not distributed because there is no continuous tone value to the left of the continuous tone value in location $C_{-1,-2}$. The continuous tone value in location $C_{-2,-1}$ now comprises its original continuous tone value (which is the same as the value originally in location $C_{1,1}$) together with the accumulated error diffused to it from the prediction of neighboring continuous tone values ahead of it (in this case, only the continuous tone value in location $C_{-2,-2}$).

After the continuous tone value in location $C_{-2,-2}$ is converted to a corresponding predicted binary value by the block 36, and after diffusion of the resulting difference D, a decision block 37 determines whether j is equal to x+3, where x is the number of columns of continuous tone values to be converted (in this example, x is equal to 10 as shown in FIG. 5). Since j is currently equal to −2, the program returns to the block 35 which increments j by 1. The block 36 then converts the continuous tone value in location $C_{-2,-1}$ to a corresponding predicted binary value using thresholding and diffusion as described above.

This process continues along the row −2 in order to convert the remaining continuous tone values in that row to corresponding predicted binary values by repeatedly incrementing j by 1 and converting the next continuous tone value. When j is equal to x+3 (or 13 in this example), a block 38 sets a variable k to 0 and a block 39 increments k by 1. The program continues the conversion process through point B to a block 40, FIG. 6B, which determines a first row (i.e. row −2) of intermediate T values. These T values result from the horizontal application of the filter values to the predicted binary values in locations $B_{-2,-2}$-$B_{-2,13}$ of FIG. 8 and are saved so that the filter values may also be applied vertically. With i=−2 and k=1, the first T value to be determined is $T_{-2,1}$. The value $T_{-2,1}$ is equal to the sum of each of the first seven binary values of FIG. 8 multiplied by a corresponding filter element from the separable filter shown in FIG. 4. Accordingly, $T_{-2,1}$ is determined by the following equation:

$$T_{-2,1}=(B_{-2,-2})(W_1)+(B_{-2,-1})(W_2)+(B_{-2,0})(W_3)+(B_{-2,1})(W_4)+(B_{-2,2})(W_5)+(B_{-2,3})(W_6)+(B_{-2,4})(W_7). \quad (1)$$

A decision block 41 determines whether k is equal to x (i.e. the number of columns of original continuous tone values to be converted). If k is not equal to x, the program returns through point E to the block 39 which increments k by 1. The block 40 then determines the next T value, $T_{-2,2}$, as follows:

$$T_{-2,2}=(B_{-2,-1})(W_1)+(B_{-2,0})(W_2)+(B_{-2,1})(W_3)+(B_{-2,2})(W_4)+(B_{-2,3})(W_5)+(B_{-2,4})(W_6)+(B_{-2,5})(W_7) \quad (2)$$

At this time, since k is not yet equal to x, k is again incremented by 1 by the block 39 and the next T value, $T_{-2,3}$, is determined. This process continues to calculate T values for the row −2 until the value $T_{-2,10}$ is determined as follows:

$$T_{-2,10}=(B_{-2,7})(W_1)+(B_{-2,8})(W_2)+(B_{-2,9})(W_3)+(B_{-2,10})(W_4)+(B_{-2,11})(W_5)+(B_{-2,12})(W_6)+(B_{-2,13})(W_7) \quad (3)$$

After the block 40 has determined $T_{-2,10}$, k is now equal to x (i.e. 10 in the example of FIG. 5) and a decision block 42 checks to determine whether i is greater than or equal to 4. Because i is currently equal to −2, the program returns through point A to the block 33, FIG. 6A, where i is incremented by 1 from a value of −2 to a value of −1 and the variable j is reset to −3 by the block 34. The block 35 then increments j by 1. The block 36 then converts the continuous tone value in location $C_{-1,-2}$ to a predicted binary value in location $B_{-1,-2}$ in FIG. 8. This prediction process proceeds to the right along row −1 until the continuous tone value in location $C_{-1,13}$ is converted to a predicted binary value. After the continuous tone value in location $C_{-1,13}$ is converted to a predicted binary value, the decision block 37 determines that j is equal to x+3 (i.e. 13 in the example), and the block 38 resets the variable k to zero and the block 39 increments k by 1. With i=−1 and k=1, the block 40 determines a value $T_{-1,1}$ in accordance with the following equation:

$$T_{-1,1}=(B_{-1,-2})(W_1)+(B_{-1,-1})(W_2)+(B_{-1,0})(W_3)+(B_{-1,1})(W_4)+(B_{-1,2})(W_5)+(B_{-1,3})(W_6)+(B_{-1,4})(W_7). \quad (4)$$

The remainder of row −1 of the T values are similarly determined by repeatedly incrementing k by 1 for each T value in row −1 and executing the block 40. When k is equal to x (i.e. 10 in the example), and with i still less than 4, the program returns to the block 33 where the continuous tone values in row 0 of FIG. 7 are converted to predicted binary values in row 0 of FIG. 8. These predicted binary values are used by the block 40 to calculate a corresponding row of intermediate T values. Thus, the program continues to operate until all of the continuous tone values in the first seven rows of FIG. 7 have been converted to predicted binary values and these predicted binary values have been used to calculate seven rows of intermediate T values. FIG. 10 shows the resulting T values which have been determined by the horizontal application of the seven element separable filter shown in FIG. 4 to the first seven rows of predicted binary values shown in FIG. 8.

In order to improve the visual appearance of the final reproduced image, random thresholding can be used to convert continuous tone values to predicted binary values. Accordingly, each continuous tone value is compared against a random threshold such as may produced by a random number generator, for example. Thus, while a threshold of 128 might be used to predict a binary value for one continuous tone value, a threshold of 196 or a threshold of 114 may be used to predict the binary value for the next continuous tone value. Furthermore, serpentine rastering can be effected during this prediction process. That is, after the binary values are predicted by converting the continuous tone values in row −2 in sequence to the right using diffusion pattern 8 of FIG. 9, and when the continuous tone values in row −1 are to be converted to predicted binary values, the continuous tone value in location $C_{-1,13}$ immediately below the continuous tone value in location $C_{-2,13}$ is next converted to a predicted binary value. Conversion then proceeds to the left along row −1 from the continuous tone value in location $C_{-1,13}$ shown in FIG. 7 to the continuous tone value in location $C_{-1,-2}$. As conversion proceeds to the left, the difference D between the continuous tone value being converted and its predicted binary value is diffused according to the diffusion pattern 9 shown in FIG. 9. After the continuous tone value in location $C_{-1,-2}$ has been converted to a predicted binary value, and when the continuous tone values in row 0 are to be converted to predicted binary values, conversion proceeds to the right along row 0 from the continuous tone value in location $C_{0,-2}$ to the continuous tone value in location $C_{0,13}$ using diffusion pattern 8. The continuous tone values in row 1 are converted from right to left, and so on.

Once the row 4 of T values have been calculated, i is equal to or greater than 4 as determined by the decision block 42, and the block 43 sets a variable n to 0 and a block 44 increments n by 1. With i=4 and n=1, a block 45 then applies the seven filter values to the first column of intermediate T values in order to determine a variable u as follows:

$$u=(W_1)(T_{-2,1})+(W_2)(T_{-1,1})+(W_3)(T_{0,1})+(W_4)(T_{1,1})+(W_5)(T_{2,1})+(W_6)(T_{3,1})+(W_7)(T_{4,1}). \quad (5)$$

As noted in greater detail hereinafter, errors $e_0$ and $e_1$ are calculated based in part upon the variable u and are used to decide whether to convert the continuous tone value in location $C_{1,1}$ to a binary "0" or to a binary "1". The separable filter value $W_4$ is applied twice to the predicted binary value in location $B_{1,1}$ during calculation of the variable u. That is, as can be seen from the block 40 of FIG. 6B, when i=1 and k=1, $$T_{1,1}=(W_1)(B_{1,-2})+(W_2)(B_{1,-1})+(W_3)(B_{1,0})+(W_4)(B_{1,1})+(W_5)(B_{1,2})+(W_6)(B_{1,3})+(W_7)(B_{1,4}) \quad (6)$$

and thus $T_{1,1}$ is dependent, in part, upon $(W_4)(B_{1,1})$. Since u is dependent, in part, upon $(W_4)(T_{1,1})$ as shown by equation (5), the result is that filter value $W_4$ is applied twice to the predicted binary value in location $B_{1,1}$. Therefore, before the errors $e_0$ and $e_1$ are determined, a block 46 subtracts out the square of the filter value $W_4$ multiplied by the predicted binary value in the location $B_{1,1}$ from the variable u.

A block 47 now determines the error $e_0$ by subtracting a sum from the continuous tone value in location $C_{1,1}$. This sum is obtained by adding the variable U to the product of a binary value of "0" assumed for the binary value in location $B_{1,1}$ and the filter value $W_4{}^2$. (Since the product of zero with a factor is always equal to zero, the sum is equal to the variable U in this case.) A block 48 (FIG. 6C) determines the error $e_1$ in the same manner except that a binary value of "1" is assumed for the binary value in location $B_{1,1}$.

The magnitudes (i.e. absolute values) of these two errors are compared to one another by a decision block 49 and, if the magnitude of $e_0$ is greater than the magnitude of $e_1$, the continuous tone value in location $C_{1,1}$ is converted by a block 50 to a binary value of "1", which binary value is placed into location $B_{1,1}$. On the other hand, if the magnitude of $e_0$ is not greater than the magnitude of $e_1$, the continuous tone value in location $C_{1,1}$ is instead converted by a block 51 to a binary value of "0", which binary value is placed into location $B_{1,1}$. Thus, the predicted binary value in the location $B_{1,1}$ of FIG. 8 is replaced with the actual binary value to which the continuous tone value in location $C_{1,1}$ is converted.

After conversion, a block 52 i diffuses the error $e_0$ if the continuous tone value in location $C_{1,1}$ was converted to a binary value of "0". Otherwise, the block 52 diffuses the error $e_1$. Whichever error is diffused, it is diffused to continuous tone values yet to be converted using diffusion pattern 8 of FIG. 9.

At this point, there is now one converted binary value, i.e. the binary value in the location $B_{1,1}$. If the converted binary value now in the location $B_{1,1}$ is different than the predicted binary value previously in the location $B_{1,1}$, a block 53 recomputes all T values that depended upon the predicted binary value existing in location $B_{1,1}$ prior to conversion of the continuous tone value in location $C_{1,1}$. Thus, if necessary due to a difference between the predicted binary value previously in the location $B_{1,1}$ and the converted binary value, T values $T_{1,1}$, $T_{1,2}$, $T_{1,3}$, and $T_{1,4}$ are recomputed using the binary value now in the location $B_{1,1}$. More specifically, if the predicted binary value previously in location $B_{1,1}$ was a binary "0" and if the continuous tone value in location $C_{1,1}$ was converted to a binary "1", the converted binary value "1" in location $B_{1,1}$ is multiplied by a filter value appropriate to each T value and the result is merely added to the corresponding T value. Accordingly, $(W_4)(B_{1,1})$ is added to $T_{1,1}$, $(W_3)(B_{1,1})$ is added to $T_{1,2}$, $(W_2)(B_{1,1})$ is added to $T_{1,3}$, and $(W_1)(B_{1,1})$ is added to $T_{1,4}$.

On the other hand, assuming that the predicted binary value previously in location $B_{1,1}$ was a binary "1" and the continuous tone value location $C_{1,1}$ was converted to a binary "0", the predicted binary value "1" previously in location $B_{1,1}$ is multiplied by an appropriate filter value and merely subtracted from the corresponding T value. Accordingly, $(W_4)(B_{1,1})$ is subtracted from $T_{1,1}$, $(W_3)(B_{1,1})$ is subtracted from $T_{1,2}$, $(W_2)(B_{1,1})$ is subtracted from $T_{1,3}$, and $(W_1)(B_{1,1})$ is subtracted from $T_{1,4}$.

After the appropriate T values have been recomputed, a decision block 54 determines whether n is equal to x. If not, the block 44 (FIG. 6B) increments n by 1. With n now equal to 2, the block 45 computes a new value for the variable u based upon the next column of T values according to the following equation:

$$u=(W_1)(T_{-2,2})+(W_2)(T_{-1,2})+(W_3)(T_{0,2})+(W_4)(T_{1,2})+(W_5)(T_{2,2})+(W_6)(T_{3,2})+(W_7)(T_{4,2}). \quad (7)$$

Control then passes to the blocks 46–54 wherein the conversion of the continuous tone value in location $C_{1,2}$ is effected and the resulting error diffused. Control remains in the loop comprising blocks 44–54 until all of the remaining continuous tone values $C_{1,3}$–$C_{1,10}$ of this first row of the continuous tone values shown in FIG. 5 have been converted.

When the last continuous tone value in the first row is converted, n=x and a decision block 55 determines whether i is greater than or equal to y (i.e. the number of rows of continuous tone values to be converted; in the example of FIG. 5, y is also equal to 10). Since i is equal to 4 at this time, a block 56 duplicates the left and right edge continuous tone values in locations $C_{5,1}$ and $C_{5,10}$ of row 5 as shown in FIG. 5 into locations $C_{5,-2}$, $C_{5,-1}$, and $C_{5,0}$ and into locations $C_{5,11}$, $C_{5,12}$, and $C_{5,13}$, respectively. The program proceeds back to the block 33 where i is incremented by 1. Next, the block 34 resets j to −3 and the block 35 increments j by 1. The block 36 then predicts another row of binary values in locations $B_{5,-2}$–$B_{5,13}$ for this fifth row of continuous tone values using the same error diffusion process as was previously used to predict binary values. In this regard, it should be noted that the error portions resulting from the prediction of binary values for the continuous values $C_{4,-2}$-$C_{4,13}$ were previously saved and are added to the continuous tone values $C_{5,-2}$-$C_{5,13}$ according to the diffusion pattern 8 or 9 of FIG. 9.

In order to determine the next row (i.e. the fifth row) of T values, the variable k is reset to 0 by the block 38 and is incremented by 1 by the block 39. The block 40 then calculates the fifth row of T values. Thus, the block 40 calculates the value $T_{5,1}$ as follows:

$$T_{5,1}=(B_{5,-2})(W_1)+(B_{5,-1})(W_2)+(B_{5,0})(W_3)+(B_{5,1})(W_4)+(B_{5,2})(W_5)+(B_{5,3})(W_6)+(B_{5,4})(W_7). \quad (8)$$

The decision block 41 then determines whether k is equal to x and, if not, the block 39 increments k by 1 and the block 40 calculates the next T value, $T_{5,2}$, as follows:

$$T_{5,2}=(B_{5,-1})(W_1)+(B_{5,0})(W_2)+(B_{5,1})(W_3)+(B_{5,2})(W_4)+(B_{5,3})(W_5)+(B_{5,4})(W_6)+(B_{5,5})(W_7). \quad (9)$$

The other T values $T_{5,3}$-$T_{5,10}$ are calculated in the same fashion. When k is equal to 10, the block 40 calculates $T_{5,10}$ as follows:

$$T_{5,10}=(B_{5,7})(W_1)+(B_{5,8})(W_2)+(B_{5,9})(W_3)+(B_{5,10})(W_4)+(B_{5,11})(W_5)+(B_{5,12})(W_6)+(B_{5,13})(W_7). \quad (10)$$

With the fifth row of the intermediate T values calculated, the second row of the continuous tone values shown in FIG. 5 can now be converted to binary values. Accordingly, since k is equal to x as determined by the decision block 41, and since i (which is now equal to 5) is greater than or equal to 4 as determined by the decision block 42, the block 43 resets n to 0 and the block 44 increments n by 1. With i=5 and n=1, the block 45 then applies the seven filter values to the first column of intermediate T values in order to determine the variable u as follows:

$$u=(W_1)(T_{-1,1})+(W_2)(T_{0,1})+(W_3)(T_{1,1})+(W_4)(T_{2,1})+(W_5)(T_{3,1})+(W_6)(T_{4,1})+(W_7)(T_{5,1}). \quad (11)$$

The block 46 corrects the value of u as previously described, and the blocks 47 and 48 determine the errors $e_0$ and $e_1$ based upon the continuous tone value in location $C_{2,1}$. The blocks 49-53 convert the continuous tone value in location $C_{2,1}$ to a binary value in location $B_{2,1}$, distribute the error $e_0$ or $e_1$, and recompute those intermediate T values which were calculated based upon the predicted binary value in location $B_{2,1}$. The blocks 44-54 similarly convert the remaining continuous tone values in the fifth row of continuous tone values, and the blocks 33-56 convert the sixth through the y−3 rows of continuous tone values in the fashion noted above.

As shown in FIG. 6C, after the continuous tone values in row 7 (i.e. i=10) are converted to corresponding binary values and while i is still equal to 10, the decision block 55 determines that i is no longer less than y (where y=10 in the example) and a decision block 57 checks to determine whether i is equal to y+3. Since i is now equal to y (i.e. 10), a block 58 duplicates the last row (i.e. row y) of continuous tone values into an eleventh row of duplicated continuous tone values. Accordingly, in the FIG. 5 example, the continuous tone value in location $C_{10,1}$ is duplicated into location $C_{11,1}$, the continuous tone value in location $C_{10,2}$ is duplicated into location $C_{11,2}$, and so on until the continuous tone value in location $C_{10,10}$ is duplicated into location $C_{11,10}$. Next, the block 58 duplicates the continuous tone value in location $C_{11,1}$ into locations $C_{11,0}$, $C_{11,-1}$, and $C_{11,-2}$ and the continuous tone value $C_{11,10}$ into locations $C_{11,11}$, $C_{11,12}$, and $C_{11,13}$.

Control then passes to the blocks 33-55 where binary values are predicted by the block 36 for the y+1 row (i.e. row 11) of continuous tone values, the y+1 row (i.e. row 11) of intermediate T values are calculated by the block 40 based upon these predicted binary values, and the y−2 row (i.e. row 8) of continuous tone values are converted by the blocks 44-54 into binary values based upon the fifth-eleventh rows of intermediate T values. Then, since i is again greater than or equal to y, the decision block 55 passes control to the decision block 57. Since i is not yet equal to y+3 (i.e. 13 in the example), the block 58 creates a twelveth row of duplicated continuous tone values by duplicating the continuous tone values in the tenth row of FIG. 5 in the same manner as the tenth row was duplicated to form the eleventh row of duplicated continuous tone values. The blocks 33-55 then convert the continuous tone values in the ninth row (i=12) into binary values in the same manner as the eighth row of continuous tone values were converted. Since i is not yet equal to y+3 (i.e. 13), the tenth row of continuous tone values is again duplicated into a thirteenth row of duplicated continuous tone values and the blocks 33-55 convert the last row y (i.e. the tenth row in the example) of continuous tone values to binary values. At this point, i=y+3 as determined by the decision block 57 and the conversion process ends.

Typically, in actual practice, there are thousands of columns and rows of continuous tone values to be converted. The separable filter is of the low pass type that limits the bandwidth of the reproduction to that of the original. Also, because the use of a separable filter permits the calculation of intermediate T values each of which is used in the conversion of several continuous tone values, the use of a separable filter results in a substantial reduction in the total number of calculations made by the end of the conversion process.

After the process of converting all continuous tone values to corresponding half-tone binary values has been completed, these values can be resampled by the block 25, such as by pixel duplication, if the dot resolution still needs to be increased in order to match the resolution of the marking device. For example, the resolution of the binary values as a result of screenless conversion may be on the order of 750 dots per inch whereas the marking device may have a resolution of 1500 or more dots per inch. The resampling employed by the block 25 may simply create additional bit positions in the final binary value array and duplicate each bit position of the binary value array one place to the right and one place down.

By way of example, if the binary values resulting from screenless conversion by the block 24 are as shown in columns A, C, E, G, and I and rows 1, 3, 5, 7, and 9 of FIG. 12, the resampler 25 creates new bit positions shown in columns B, D, F, H, and J and rows 2, 4, 6, 8, and 10, and duplicates each binary value by placing the same binary value in the adjacent bit position to the right. Thus, a one is placed in position B1, a zero in position D1, a one in position F1, a one in position H1 and a zero in position J1. Then, the values in row 1 are also duplicated into corresponding bit positions in row 2 directly below. Thus, a one is placed in positions A2 and B2, a zero in positions C2 and D2, a one in positions E2 and F2, a one in positions G2 and H2 and a zero in positions I2 and J2. The other binary values are similarly duplicated. Accordingly, FIG. 13 shows the completed array resulting from the duplication of the array shown in FIG. 12.

The result of the duplication effected by the resampler 25 is then applied to the bit-wise merger block 28 of FIG. 2. The line work information may also be applied directly to the block 28 or may alternatively be digitally resampled by a block 26 (identical to the block 23) if its resolution needs to be increased and screenlessly converted by block 27 (identical to block 24) in order to improve the visual appearance of the line work. The resulting bit map can then be used by film plotter 14 for plotting film or can be used directly to form printing plates.

As described above, the decision as to whether to convert a continuous tone value to one binary value or another depends upon a comparison of the magnitude of errors $e_0$ and $e_1$. This comparison is equivalent to comparing the error $e_0$ to "1"($W_4^2/2$) so that, if the error $e_0$ is greater than "1"($W_4^2/2$), the continuous tone value is converted to a binary "1" and, if the error $e_0$ is less than "1"($W_4^2/2$), the continuous tone value is converted to a binary "0", it being remembered that a binary "1" is actually a digital value of 255.

While the screenless conversion system described in detail above converts a continuous tone value into an output value having only one of two possible levels (a "0" or a "1"), and thus produces a half-tone "binary" value, it should be noted that the continuous tone value may instead be converted into an output value having more than two possible levels. In fact, the present system can be used to convert a continuous tone value having at least M possible levels (such as a continuous tone value having one of 256 possible levels or such as an analog value) to an output value having N possible levels, where M is greater than N.

In converting a continuous tone value to an output value having more than two possible levels, an error is generated for each possible level of the output value. For example, if the output value can have three possible levels, a first error is generated based upon: (1) at least one continuous tone value which has already been converted; (2) at least one continuous tone value yet to be converted; and (3) an output value assumed to have the first possible level. A second error is generated based upon: (1) at least one continuous tone value which has already been converted; (2) at least one continuous tone value yet to be converted; and (3) an output value assumed to have the second possible level. A third error is generated based upon: (1) at least one continuous tone value which has already been converted; (2) at least one continuous tone value yet to be converted; and (3) an output value assumed to have the third possible level. The magnitudes (i.e. absolute values) of the three errors are compared and the continuous tone value is converted to the output value resulting in the smallest error magnitude.

When the separable filter is used in the conversion process as described above, its values are applied to the output values corresponding to continuous tone values which have already been converted, to output values corresponding to continuous tone values yet to be converted, and to output values assumed to have each of the three possible levels. The prediction process may use all of the levels possible for the output values or may use only two levels or any other number of levels even though continuous tone values are being converted to output values having more than two possible levels. The diffusion process, both after each continuous tone value is converted and during the prediction process, remains unaffected by the number of possible levels for the output value.

Continuous tone values may be generated by devices other than a scanner. For example, in FIG. 14, a descreener 72, such as the Model CN420 descreening scanner manufactured by Linotype-Hell of Germany, generates continuous tone values which are supplied to processor 73. The processor 73 converts these continuous tone values into output values which can be used by marking device 74 to plot film or to directly form printing plates in the manner described in connection with FIGS. 1A and 1B. The descreener 72 scans a separation which has been previously prepared (such as by a halftoning process) and integrates the elementary plotter marks on the separation to generate continuous tone values. The processor 73 converts these continuous tone values into output values using the process shown in FIGS. 6A–6C. One of the primary advantages of the system shown in FIG. 14 is that a regularly screened separation can be converted into a screenless separation using the process disclosed herein thereby improving the quality of the reproduction.

In FIG. 15, an input device 81, which may be the descreener 72 of FIG. 14 or the scanner 11 of FIGS. 1A or 1B, supplies continuous tone values to a processor 82. The processor 82 converts these continuous tone values into output values which can be used by a marking device 83 to plot film or to directly form printing plates in the manner described in connection with FIGS. 1A and 1B. The processor 82 converts these continuous tone values into output values using the process described in FIGS. 6A–6C. A proofer 84 receives the output values from the processor 82 in order to allow an operator to make a proof and any final adjustments before creating a final proof to be used as a standard during the printing of reproductions. One of the primary advantages of the system shown in FIG. 15 is that the proofer 84 can use the output values directly in order to proof the reproduction. The proofer 84 should operate at the same resolution as the output values. Furthermore, the color correction parameters used in color corrector 22 will be different in the case of a proofer than in the case of a press. In the case of a proofer, the correction parameters will depend upon the characteristics of the proofer; but in the case of a press, the correction parameters will depend upon ink, paper and marking device characteristics.

Other variations will be apparent to one skilled in the art without departing from the scope of the present invention.

We claim:

1. A system for converting one input value of a series of input values into an output value wherein previous input values have been converted to previous output values and subsequent input values are to be converted to output values, the system comprising:

error generating means for generating first and second errors for the one input value undergoing conversion, wherein the first error is based upon application of a one dimensional separable filter to a selected number of previous output values, to output values predicted for a certain number of subsequent input values, and to an output value having an assumed first level for the one input value undergoing conversion, and wherein the second error is based upon application of the one dimensional separable filter applied to the selected number of previous output values, to the output values predicted for the certain number of subsequent input values, and to an output value having an assumed second level for the one input value undergoing conversion; and output value setting means for setting the one input value undergoing conversion to an output value having the first level if the first error is less than the second error and to an output value having the second level if the first error is greater than the second error.

2. The system of claim 1 wherein the output value setting means comprises error diffusing means for diffusing the first error to a selected number of the subsequent input values if the one input value undergoing conversion is converted to the output value having the first level and for diffusing the second error to a selected number of the values if the one input value undergoing conversion is converted to the output value having the second level.

3. The system of claim 2 wherein the error generating means includes comparing means for comparing each of the certain number of subsequent input values to a threshold, converting means responsive to the comparing means for converting each of the certain number of subsequent input values to a corresponding predicted output value having the first level or the second level depending upon whether the subsequent input value is above or below the threshold, and difference diffusing means for diffusing a difference between each of the certain number of subsequent input values and the predicted output value corresponding thereto to other subsequent input values.

4. The system of claim 3 wherein the threshold is a random threshold.

5. The system of claim 3 wherein the difference diffusing means diffuses the difference in a serpentine manner.

6. The system of claim 1 further including sampling means for sampling an original at a first resolution to obtain sampled values and wherein the error generating means further includes digital resampling means responsive to the sampling means for increasing the resolution of the sampled values to a second resolution greater than the first resolution to obtain the series of input values.

7. The system of claim 6 wherein the sampled values have a certain bandwidth and wherein the separable filter is of the low pass type that limits the output values to the certain bandwidth.

8. A system for sequentially converting input values into corresponding output values so that, at a given instant in time, an input value undergoing conversion has before it input values previously converted to corresponding output values and after it subsequent input values yet to be converted to output values, the system comprising:

a separable filter;

error generating means for generating first and second errors for the input value undergoing conversion; the first error being based upon application of the separable filter to a two dimensional array comprising a first set of output values corresponding to the previously converted input values, a second set of output values corresponding to the subsequent input values and an output value having a first level assumed for the input value undergoing conversion and the second error being based upon application of the separable filter to a further two dimensional array comprising the first and second sets of output values and an output value having a second level assumed for the input value undergoing conversion; and output value setting means for setting the input value undergoing conversion to the output value having the first level if the first error is less than the second error and to the output value having the second level if the first error is greater than the second error.

9. The system of claim 8 wherein the output value setting means comprises error diffusing means for diffusing the first error to a selected number of the input values yet to be converted if the input value undergoing conversion is converted to the output value having the first level and for diffusing the second error to a selected number of the input values yet to be converted if the input value undergoing conversion is converted to the output value having the second level.

10. The system of claim 8 wherein the error generating means includes means for predicting output values for the input values yet to be converted to obtain the second set of output values.

11. The system of claim 10 wherein the predicting means includes comparing means for comparing each input value yet to be converted to a threshold, converting means for converting each input value yet to be converted to a predicted output value having the first level or to a predicted output value having the second level depending upon whether the input value yet to be converted is below or above the threshold, and difference diffusing means for diffusing the difference between each input value yet to be converted and the corresponding predicted output value to a selected number of input values yet to be converted.

12. The system of claim 11 wherein the threshold is a random threshold.

13. The system of claim 11 wherein the output value setting means comprises error diffusing means for diffusing the first error to a selected number of the input values yet to be converted if the input value undergoing conversion is converted to the output value having the first level and for diffusing the second error to a selected number of the input values yet to be converted if the input value undergoing conversion is converted to the output value having the second level.

14. The system of claim 11 wherein the system includes means for providing a series of sampled values at a first resolution and wherein the error generating means includes digital resampling means for increasing the resolution of the sampled values to a second resolution greater than the first resolution to obtain the input values.

15. The system of claim 14 wherein the sampled values have a certain bandwidth and wherein the separable filter is of the low pass type that limits the output values to the certain bandwidth.

16. The system of claim 14 further including a film plotter coupled to the output value setting means.

17. The system of claim 14 further including means coupled to the output value setting means for producing a printing plate.

18. The system of claim 14 wherein the providing means comprises a scanner that scans a continuous tone original on a pixel-by-pixel basis.

19. The system of claim 14 wherein the providing means comprises a descreener that converts a halftone original into a continuous tone representation and means for sampling the continuous tone representation to obtain the series of sampled values.

20. A method of converting input values to corresponding output values wherein an input value undergoing conversion has before it previously converted input values and after it input values yet to be converted and wherein each of the input values has one of at least M possible levels and each of the output values has one of N possible levels where M is greater than N, the method comprising the steps of:

(a) using a separable filter to generate N errors wherein each of the N errors is based upon an output value having a corresponding one of the N possible levels assumed for the input value undergoing conversion and wherein at least one of the N errors is smallest; (b) converting the input value undergoing conversion to an output value having a level associated with the smallest error;

(c) diffusing the smallest error to a predetermined number of input values yet to be converted; and (d) repeating steps (a)-(c) for each of the input values yet to converted.

21. The method of claim 20 wherein the step of generating N errors includes the steps of applying the separable filter to output values corresponding to a selected number of previously converted input values, applying the separable filter to output values corresponding to a selected number of input values yet to be converted, and applying the separable filter to an output value having a corresponding one of the N possible levels assumed for the input value undergoing conversion.

22. The method of claim 21 wherein the step of generating N errors includes the step of predicting each of the output values corresponding to the selected number of input values yet to be converted by comparing each such input value to the N possible levels, converting each such input value to a predicted output value having one of the N possible levels dependent upon which of the N possible levels is closest to such input value, and diffusing a difference between each such input value and its corresponding predicted output value to a predetermined, subsequent number of input values yet to be converted.

23. The method of claim 22 wherein the step of predicting each of the output values comprises the step of diffusing the difference in a serpentine manner.

24. The method of claim 21 wherein the step of generating N errors includes the step of predicting each of the output values corresponding to the selected number of input values yet to be converted by comparing each such input value to a threshold, converting each such input value to a predicted output value as a result of such comparison, and diffusing a difference between each such input value and its corresponding predicted output value to a predetermined, subsequent number of input values yet to be converted.

25. The method of claim 24 wherein the step of predicting each of the output values includes the step of generating random thresholds against which the input values are compared.

26. The method of claim 25 wherein the step of predicting each of the output values comprises the step of diffusing the difference in a serpentine manner.

27. The method of claim 21 further comprising the step of sampling a continuous tone original image to obtain sampled values at a first resolution and increasing the resolution of the sampled values to obtain the input values.

28. The method of claim 27 wherein the step of sampling comprises the step of using a scanner to obtain the sampled values.

29. The method of claim 27 wherein the step of sampling comprises the steps of descreening a halftone original image and sampling the descreened image to obtain the sampled values.

30. The method of claim 20 wherein the separable filter comprises a plurality of filter values arranged in a linear array.

31. The method of claim 30 wherein the step of converting includes the steps of (i) predicting output values for a selected number of input values yet to be converted, wherein such predicted output values and output values corresponding to previously converted input values are arranged together in a two dimensional array and (ii) applying the linear array of filter values to the output values of the two dimensional array along first and second dimensions thereof.

32. The method of claim 31 wherein the step of converting includes the steps of determining intermediate T values based upon application of the linear array of filter values along one dimension of the two dimensional array and using the T values to compute the N errors.

33. The method of claim 32 wherein the step of determining intermediate T values comprises the step of applying the filter values horizontally to the two dimensional array.

34. The method of claim 33 wherein the step of using the T values includes the step of determining a variable u according to the following equation:

$$u = \sum_{m=1}^{p} W_m \cdot T_{i-7+m,n}$$

where i and n identify the T values, $W_m$ is a filter value to be applied to a corresponding T value, and p is the number of filter values.

35. The method of claim 34 wherein the T values are arranged in a further two dimensional array and wherein the step of determining the variable u includes the step of applying the filter values vertically to the further two dimensional array.

36. The method of claim 33 wherein the T values are arranged in a further two dimensional array and wherein the step of converting includes the step of applying the filter values vertically to the further two dimensional array.

37. The method of claim 36 wherein the step of converting includes the step of recomputing those T values based upon an output value corresponding to a just converted input value for later use during conversion of subsequent input values.

38. The method of claim 32 wherein the step of converting includes the step of recomputing those T values based upon an output value corresponding to a just converted input value for later use during conversion of subsequent input values.

* * * * *

UNITED STATES PATENT AND TRADEMARK OFFICE
CERTIFICATE OF CORRECTION

PATENT NO. : 5,335,089
DATED : August 2, 1994
INVENTOR(S) : Zhenhua Xie and Michael A. Rodriguez It is certified that error appears in the above-indentified patent and that said Letters Patent is hereby corrected as shown below:

Column 10, line 51, "$B_{-2,2}$" should be --$B_{2,-2}$--;

Column 14, line 1, "52 i" should be --52--.

Signed and Sealed this

Fourteenth Day of March, 1995

Attest:

*Attesting Officer*

BRUCE LEHMAN

*Commissioner of Patents and Trademarks*